(12) United States Patent
Leopold

(10) Patent No.: US 7,753,985 B2
(45) Date of Patent: Jul. 13, 2010

(54) REDUCTION OF BIURET AND FREE AMMONIA DURING A METHOD FOR PRODUCING FERTILIZER GRANULATES CONTAINING UREA

(75) Inventor: Eugen Leopold, Dortmund (DE)

(73) Assignee: UHDE GmbH, Dortmund (DE)

( * ) Notice: Subject to any disclaimer, the term of this patent is extended or adjusted under 35 U.S.C. 154(b) by 720 days.

(21) Appl. No.: 10/587,920

(22) PCT Filed: Jan. 15, 2005

(86) PCT No.: PCT/EP2005/000367

§ 371 (c)(1),
(2), (4) Date: Mar. 5, 2007

(87) PCT Pub. No.: WO2005/075383

PCT Pub. Date: Aug. 18, 2005

(65) Prior Publication Data

US 2009/0019906 A1    Jan. 22, 2009

(30) Foreign Application Priority Data

Feb. 5, 2004    (DE) .................. 10 2004 005 907

(51) Int. Cl.
*C05C 9/00* (2006.01)

(52) U.S. Cl. .................................. 71/28; 71/64.03

(58) Field of Classification Search ............ 71/28, 71/64.03
See application file for complete search history.

(56) References Cited

U.S. PATENT DOCUMENTS

| | | | | |
|---|---|---|---|---|
| 2,407,139 A * | 9/1946 | Clothier et al. | ............. | 417/278 |
| 3,117,020 A * | 1/1964 | Fabris et al. | ................ | 427/213 |
| 4,219,589 A | 8/1980 | Niks et al. | | |
| 4,578,105 A * | 3/1986 | Moore | ............. | 71/28 |
| 4,943,308 A | 7/1990 | Vanmarcke et al. | | |
| 5,125,952 A * | 6/1992 | Moore et al. | .................... | 71/28 |
| 5,965,071 A | 10/1999 | Fujii et al. | | |
| 6,179,893 B1 | 1/2001 | Bendix et al. | | |
| 6,203,730 B1 * | 3/2001 | Honda et al. | .................... | 264/7 |

FOREIGN PATENT DOCUMENTS

| | | |
|---|---|---|
| AT | 281609 B | 5/1970 |
| AT | 285621 A | 11/1970 |
| AT | 291003 B | 6/1971 |
| CH | 617672 A5 | 6/1980 |
| DE | 28 25 039 A1 | 12/1978 |
| DE | 197 44 404 A1 | 4/1999 |
| EP | 0 908 430 B1 | 8/2002 |

(Continued)

OTHER PUBLICATIONS

John H. Perry, Chemical Engineers' Handbook, Fourth Edition (1963), McGraw-Hill Book Company, pp. 6-5, 6-6.*

*Primary Examiner*—Wayne Langel
(74) *Attorney, Agent, or Firm*—Marshall & Melhorn, LLC

(57) ABSTRACT

The invention relates to a method for producing a fertilizing agent containing urea, by means of synthesis step, an evaporation process, and a granulation unit. According to said method, a self-regulating centrifugal pump is used to reduce the dwell time and to optimize the positioning of the components of the method for transporting the product flow of the evaporation process to the granulation unit.

5 Claims, 2 Drawing Sheets

FOREIGN PATENT DOCUMENTS

| | | |
|---|---|---|
| GB | 1 156 099 A | 6/1969 |
| GB | 1 248 873 A | 10/1971 |
| GB | 1 404 098 A | 8/1975 |
| GB | 1 581 761 A | 12/1980 |
| JP | 57171956 A | 10/1982 |

* cited by examiner

US 7,753,985 B2

REDUCTION OF BIURET AND FREE AMMONIA DURING A METHOD FOR PRODUCING FERTILIZER GRANULATES CONTAINING UREA

BACKGROUND OF THE INVENTION

The invention relates to a process for producing urea fertilizer by means of a synthesis stage, an evaporation unit, and a granulation unit, wherein a self-regulating centrifugal pump is used to reduce the residence time and optimize the positioning of the process components for conveying the product stream from the evaporating operation to the granulation unit.

Processes for producing granulated fertilizers have been extensively described in the technical and patent literature, for which U.S. Pat. No. 6,203,730 B1, DE 28 25 039 B2, and U.S. Pat. No. 4,943,308 A may serve as examples. Typically the product stream, in the form of a melt or solution, arriving from the synthesis stage, is supplied to an evaporator, for the purpose of adjusting the water content, and then passed into the granulation stage. In certain prior-art processes, introduction into the granulator is preceded by mixing with a fine solid fraction, which is generally recycled granules.

With production volumes of $1500 \times 10^3$ kg per day or more, the optimum positioning of the individual process components is a parameter critical to the functionality and efficiency of the process as a whole. In this context it is important that liquid and solid media are as far as possible moved by means of gravity, without additional conveying equipment. The positioning of the granulator, the largest component apart from the synthesis reactor in this process, determines the disposition of the other components, and is typically arranged at a height of 8 m to 15 m. This allows the finished granules to reach the subsequent and lower-lying apparatus without a conveying equipment. Furthermore, for example, the rinsing liquid, which is regularly obtained in large quantities, can be collected via a free discharge directly beneath the granulator.

The product stream leading into the granulation unit is typically conveyed by means of a centrifugal pump, which is arranged a few meters downstream of the evaporation unit. In this arrangement the evaporation unit, by virtue of its elevated disposition, constitutes the barometric endpoint for the centrifugal pump and thus ensures the necessary pump intake pressure. Disadvantages of this positioning are the need for a high platform for a very large and heavy component and the associated piping, which unfavorably prolong the residence time of the product stream. Furthermore, these lines must be given costly and sophisticated insulation and tracers, in order to prevent incrustations on the pipe walls or of separation, and to maintain the high temperature until the final drying operation is performed in the granulator.

It is known from DE 197 44 404 that, as a function of the temperature and of the residence time in the product solution, secondary reactions of the urea occur, forming essentially polymers and condensates of urea, which have no biogenic effect and therefore lower the concentration of active compound in the granules. As well as these inactive secondary products, biuret is formed as well, which has a strongly phytotoxic effect and must therefore be suppressed as far as possible.

The concentration of the highly phytotoxic biuret in the urea solution actually increases as the temperature and residence time go up. The relationships affecting biuret formation are described in, for example, AT 285621, CH 617 672A or GB 1 404 098, and thus have been known for more than 30 years.

In the evaporation unit it is necessary to set a temperature of 110° C. to 150° C. in order to remove the required amount of water from the product solution within an adequate time. As a result, this high temperature is likewise present in the downstream pipelines, and this greatly promotes the formation of biuret. Accordingly, in the pipelines downstream of the evaporation unit, there is biuret formation to an extent which affects the end quality of the product, and its formation may be additionally intensified by further overheating of these pipelines, which are generally heated using steam.

DE 197 44 404 discloses a process in which the addition of dicyandiamide produces a crystallization inhibition effect, so that the process can be operated at temperatures of 70-90° C., thereby sharply reducing the formation of biuret. A disadvantage of that process is the high consumption of dicyandiamide, which is biologically inactive and which according to the example given in DE 197 44 404 must be added at more than 5% by weight per hour. This addition of an additive necessitates a correspondingly larger design volume and considerably increases the operating costs of the process.

A further disadvantage is that the endothermic dissolution of the dicyandiamide consumes energy, which must be supplied again at least partly to implement the subsequent drying operation in the granulator.

An important source of the biuret formation is the evaporator, and so JP 57171956 A proposes a specific operation of concentrating the solution, by designing the evaporator as a spraying tower, so that the large liquid surface area available in the tower permits a very rapid and efficient removal of water from the product solution. A disadvantage of a solution of this kind is the significantly more sophisticated evaporator design, which additionally necessitates significantly more complex control and instrumentation devices.

GB 1 404 098 proposes a process in which the urea solution prior to granulation is passed over an ion exchanger in order to separate the biuret. That process necessitates additional process components and causes higher operating costs as a result of the need to regenerate the ion exchanger material at regular intervals.

BRIEF SUMMARY OF THE INVENTION

The objective of the present invention is to provide an economically advantageous process in which the formation of biuret is reduced to a relatively far-reaching extent.

The invention is directed to a process for producing urea fertilizer by means of a synthesis stage, an evaporation unit, and a granulation unit, in which for the purpose of reducing the residence time the product solution is passed into the granulation unit using a self-regulating centrifugal pump, of the kind described for example in AT 281609 or AT 291003.

The pumps specified in AT 281609 or AT 291003 are described for the use of non-constant feed rates and low feed heights and have been known for more than 30 years. Their inventive use as part of a fertilizer production means that the evaporator can be positioned at the same level as the granulator and that the centrifugal pump need be arranged only slightly lower. As a result, the supply lines can be abandoned and/or shortened, thereby obtaining a corresponding shortening in the residence time of the product in the related piping. This shorter residence time leads to a reduction in the formation of byproducts and secondary products in the product solution.

It has been found, surprisingly, that the use of the self-regulating centrifugal pump additionally leads to a reduction of the free ammonia in the offgas. Free ammonia, which originates in part from the incomplete synthesis or forms within the downstream pipelines and treatment stages, is typically recycled to the synthesis stage with the offgas from the evaporator. Free ammonia which forms after the evaporation unit must be purified together with the offgas from the granulator. Since the use of the self-regulating centrifugal pump reduces the formation of biuret, the formation of the second reaction product, ammonia, is hindered as well.

As described in GB 1 404 098, the formation of biuret proceeds in accordance with the empirical formula 2 $OCN_2H_4 \Leftrightarrow O_2C_2N_3H_5+NH_3$, so that each molecule of biuret not formed prevents the formation of one molecule of $NH_3$ as well. In the context of the inventive use of the self-regulating pump in the production of urea granules, it is possible to achieve a >10% reduction in the offgas ammonia content compared to conventional processes.

Furthermore, the use of the self-regulating centrifugal pump considerably simplifies the cost and complexity of regulation primarily for startup and shutdown operations, since this pump, by virtue of its independence from the feed rate on the suction side, maintains the conditions of feed to the granulator stable for a longer period of time. The pump allows the suction line to be emptied almost completely before the feed to the granulator is interrupted. In addition it is possible to provide product solution in the granulator again more quickly after a stoppage, since it is not necessary to fill the suction line up to a certain level. Consequently, in relation to the prior art, the production of on-specification granules only need be interrupted for a shorter time, which is economically advantageous.

A further advantage is that in the case of shutdown operations the suction line can be almost fully emptied even during production, so that there is no need for separate emptying and recycling of the solution from this line section.

Advantageously, and in contrast to the depiction in AT 281609 or AT 291003, the self-regulating pump is positioned in the immediate vicinity of the granulator, as on the following equipment component, or, in the ideal positioning variant, is flanged directly to the granulator. This has the great advantage that the degassing of the pump or of the product solution, which is a consequence of the design, can take place at the end of the hot pipeline between evaporator and granulator. This degassing is accomplished via the bore in the shaft which communicates with the gas space of the evaporator. This is particularly effective in the case of evaporator units in which the temperatures are >120° C.

In a further advantageous embodiment of the invention the self-regulating conveying pump is arranged directly adjacent to the evaporator or is flanged to this evaporator.

BRIEF DESCRIPTION OF THE DRAWING

Shown below by way of example in
FIG. 1 is the prior art, with indications of the heights.

DETAILED DESCRIPTION OF THE DRAWING

Figure 1:
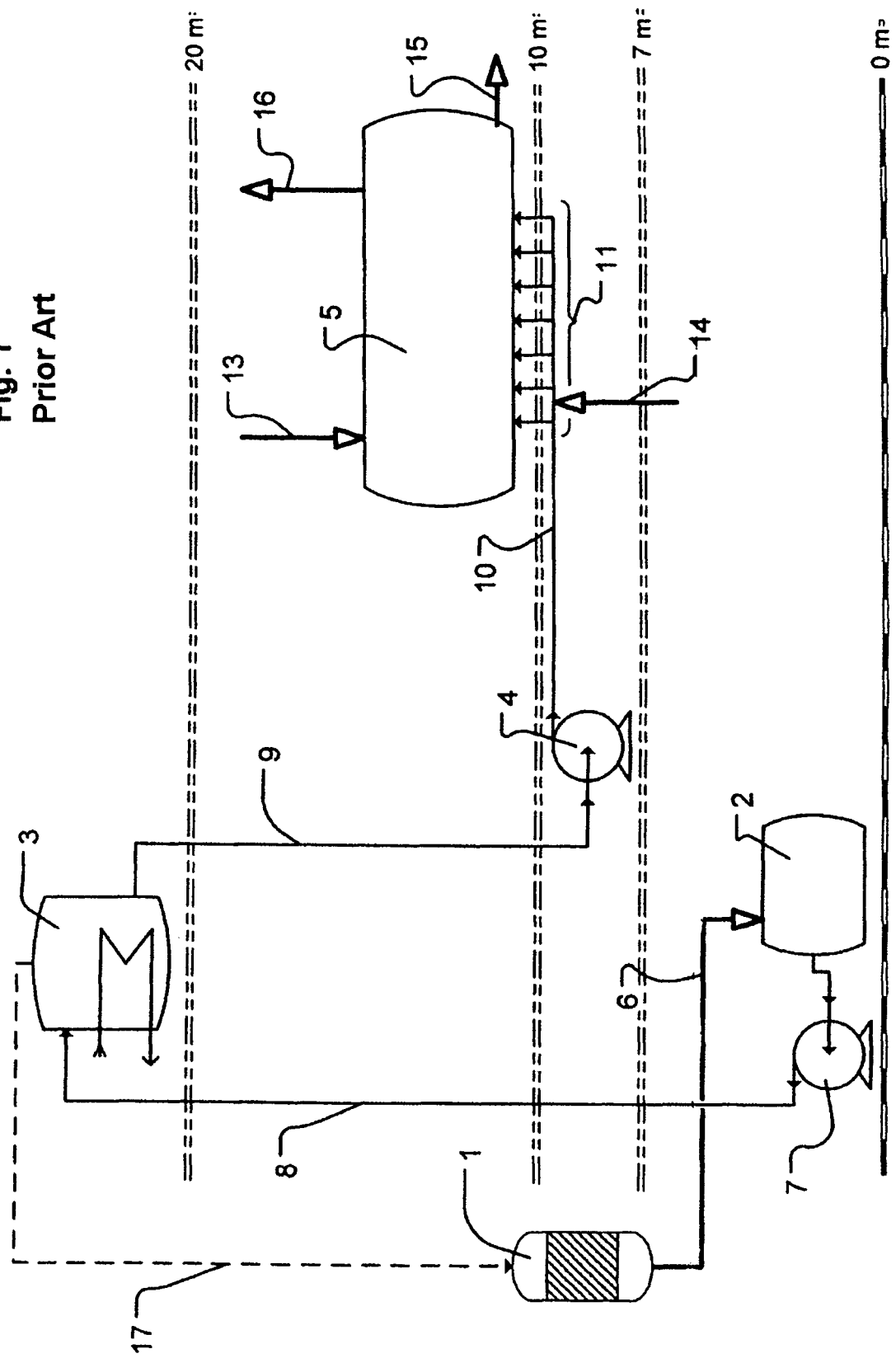

As can be seen in FIG. 1, the product formed in the synthesis stage 1 is passed via the line path 6 into a feed vessel 2, from which it is conveyed by means of a pump 7 in the line 8 from the floor level into the evaporator 3, which stands on the 20 m platform. The water vapor expelled in the evaporator 3, and also the free ammonia and other gaseous components, are returned via the pipeline 17 to the synthesis stage.

The concentrated urea solution leaves the evaporator via the pipeline 9, the suction line of the centrifugal pump 4. The difference in height which is overcome by the line 9 in the direction of the downcomer section ensures compliance with the required intake pressure or NPSH value of the centrifugal pump 4, which is positioned at a height of about 7 m. In the pipeline 10, the pressure line of this centrifugal pump 4, this solution is conveyed into the header system 11 of the granulator 5, the granulator 5 being positioned at a platform height of 10 m. The urea solution is introduced through nozzles into the granulator, together with an inert carrier gas 14. The solid granules leave the granulator via line 15 to lower-lying downstream treatment stages, which are arranged below but not depicted, and the offgas from the granulator is passed via line 17 into the offgas purification unit, which is not shown either.

Figure 2:
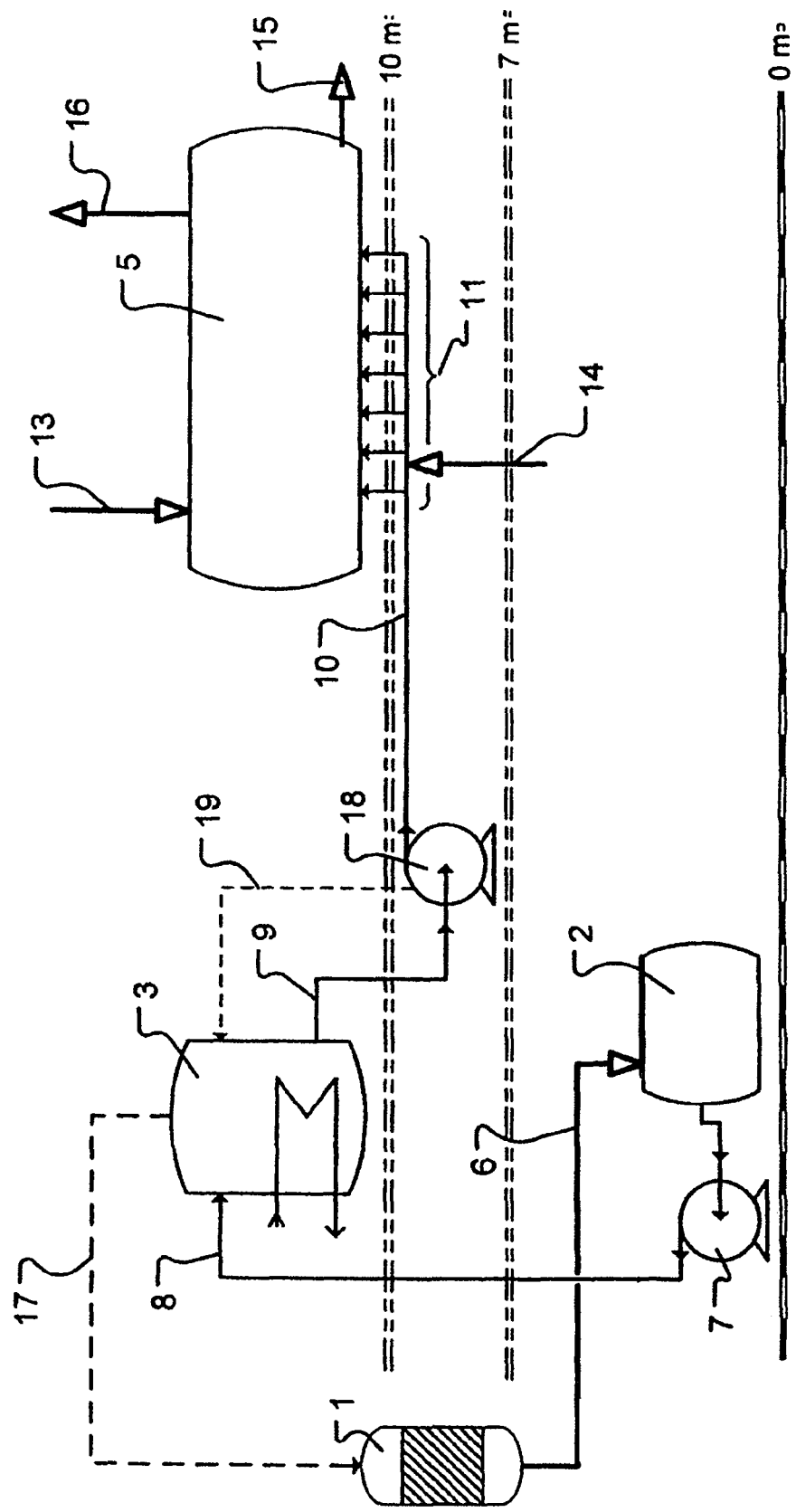
FIG. 2 shows a typical example of the optimized positioning of the process, using a self-regulating centrifugal pump.

In FIG. 2 it can be seen that in comparison to the prior art depicted in FIG. 1 there is no 20 m platform for the evaporator 3, which is instead positioned on the same level as the granulator 5. The concentrated urea solution arriving via line path 9 is passed by means of the self-regulating centrifugal pump 19 via the pipeline 10 to the header system 11 of the granulator 5. Line 19 connects the centrifugal pump 18 to the gas chamber of the evaporator 3 to satisfy design requirements 3.

In the table below, on a model basis, the reduction in biuret formation when the piping is shortened by virtue of the inventive use of a self-regulating pump is calculated on a model basis. These calculations assume a mass flow rate of 2000 metric tons per hour at 140° C.

TABLE

|  | Prior-art use of a centrifugal pump | Inventive use of the self-regulating centrifugal pump |
|---|---|---|
| Biuret formation between evaporator and granulator | 85 396 kg/h | 85 370 kg/h (difference about 0.03%) |
| Ammonia formation between evaporator and granulator | 34.5 kg/h | 30.27 kg/h (difference about 12%) |

The invention claimed is:

1. A process for producing urea fertilizer, comprising a synthesis unit, an evaporation unit, a conveying pump, and a granulation unit, the urea product stream from the synthesis unit leaving said synthesis unit in liquid phase as an aqueous solution or melt, wherein the urea product stream downstream of the evaporator unit and upstream of the granulation unit is conveyed by means of a self-regulating centrifugal pump in the direction of the granulation unit.

2. A process according to claim 1, wherein the granulation unit comprises a granulator and the self-regulating centrifugal pump is arranged directly adjacent to this granulator or flanged to it.

3. A process according to claim 1, wherein the evaporator unit comprises an evaporator and the self-regulating centrifugal pump is arranged directly adjacent to this evaporator or flanged to it.

4. A process according to claim 1, wherein the evaporator and the granulator are arranged at the same horizontal level above the floor level.

5. A process according to claim 1, wherein the self-regulating centrifugal pump is disposed at the same horizontal level as that of the evaporator.

* * * * *